US012088009B2

(12) United States Patent
Buckley et al.

(10) Patent No.: US 12,088,009 B2
(45) Date of Patent: Sep. 10, 2024

(54) LOW-COST HIGHER ORDER FLOQUET STRUCTURE INTEGRATED MEANDER LINE POLARIZER AND RADOME

(71) Applicant: Hughes Network Systems, LLC, Germantown, MD (US)

(72) Inventors: Michael Buckley, Boyds, MD (US); Varada Rajan Komanduri, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/045,651

(22) Filed: Oct. 11, 2022

(65) Prior Publication Data

US 2023/0299497 A1 Sep. 21, 2023

Related U.S. Application Data

(60) Provisional application No. 63/262,434, filed on Oct. 12, 2021.

(51) Int. Cl.
*H01Q 15/24* (2006.01)
*H01Q 1/42* (2006.01)

(52) U.S. Cl.
CPC ............. *H01Q 15/242* (2013.01); *H01Q 1/42* (2013.01); *H01Q 1/422* (2013.01)

(58) Field of Classification Search
CPC .......... H01Q 1/42; H01Q 1/422; H01Q 15/24; H01Q 15/242
See application file for complete search history.

(56) References Cited

U.S. PATENT DOCUMENTS

| | | | | |
|---|---|---|---|---|
| 2005/0104791 A1* | 5/2005 | Sun | ...................... | H01Q 15/242 343/756 |
| 2020/0028278 A1* | 1/2020 | Tomasic | ............... | H01Q 15/244 |
| 2021/0265737 A1 | 8/2021 | Buckley et al. | | |

FOREIGN PATENT DOCUMENTS

EP 3771033 A1 1/2021

OTHER PUBLICATIONS

International search report for PCT Application No. PCT/US2022/077898.
Li Xiangqiang et ak: "A polarization Conversion Radome for High-Power Microwave Applications", IEEE Antennas and wireless propagation letters, IEEE, Piscataway, NJ, US, vol. 18, No. 6, Jun. 1, 2019, (1029-06-01_, pp. 1096-1099, XP011727706, ISSN: 1536-1225, DOI: 10.1109/LAWP.2019.2909062 [retrieved on Jun. 30, 2019].

* cited by examiner

*Primary Examiner* — Daniel Munoz
(74) *Attorney, Agent, or Firm* — Capitol City TechLaw; Jasbir Singh

(57) ABSTRACT

A higher order Floquet-mode structure (HOFS) integrated meander line polarizer and radome including: a substrate including layers having a dielectric constant (dk) of 2.9; a HOFS including metal layers disposed in a first subset of the layers; and meander lines, to provide a phase shift and match, disposed in a second subset of the layers, wherein the substrate includes a low-cost material and the metal layers include a feature trace and gap widths of about 10 mils or greater.

17 Claims, 6 Drawing Sheets
(2 of 6 Drawing Sheet(s) Filed in Color)

LOW-COST HIGHER ORDER FLOQUET STRUCTURE INTEGRATED MEANDER LINE POLARIZER AND RADOME

CROSS-REFERENCE TO RELATED APPLICATIONS AND INCORPORATION BY REFERENCE

The present application claims the benefit under 35 U.S.C. 119(e) of U.S. Provisional Application Ser. No. 63/262,434, filed Oct. 12, 2021, which is incorporated herein by reference in its entirety.

FIELD

The present teachings are directed generally toward antennas, and more particularly to electronically scanned antennas. A low-cost Higher Order Floquet Structure (HOFS) Integrated Meander Line Polarizer and Radome is disclosed.

BACKGROUND

Prior art meander line polarizer technology cannot provide a low-cost polarizer with an integrated meander line polarizer and radome, where the meander line has a low axial ratio and insertion loss over a relatively wide frequency band and scan volume. In the prior art, the radome and meander line polarizer are designed as separate distinct parts resulting in unacceptable system performance that is significantly worse than the integrated meander line polarizer and radome of the present teachings. The prior art also fails to build the device on low-cost materials such as polyesters and polycarbonates. For example, the prior art axial ratio is too high at both the low and high ends of the frequency band and the radome degrades axial ratio system performance further. Moreover, for one polarization, the prior art return loss is too high by ~2 dB at the low end of the frequency band and the radome degrades axial ratio system performance further.

There are three standard standalone types of radomes: Half-wave wall radome, C sandwich radome, and Thin-Walled radome. None of the standard standalone radomes work in a meander line polarizer radome system. Each of the standalone radomes fails to meet at least one of the meander line polarizer radome system requirements: insertion loss, axial ratio, and/or environmental protection.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings are directed to a low-cost Higher Order Floquet Structure (HOFS) Integrated Meander Line Polarizer and Radome to provide improved bandwidth, insertion loss, axial ratio, and scan volume. The HOFS integrated meander line polarizer and radome may use HOFS materials for bandwidth, scan, insertion loss, and axial ratio performance. The HOFS integrated meander line polarizer and radome may use a low-cost material such as polyester and/or polycarbonate for ease of manufacturing. The HOFS integrated meander line polarizer and radome may use line widths greater than 10 mils, 12 mils, 14 mils or the like for ease of manufacturing and low-cost. The radome may provide robust environmental protection. The radome may be polycarbonate. The HOFS integrated meander line polarizer and radome may be used in ground terminals as part of a Low Earth Orbit (LEO) and Middle Earth Orbit (MEO) satellite systems, or a Geosynchronous Earth Orbit (GEO) satellite systems with moving user terminals.

In some aspects, the techniques described herein relate to a higher order Floquet-mode structure (HOFS) integrated meander line polarizer and radome including: a substrate including layers having a dielectric constant (dk) of 2.9; a HOFS including metal layers disposed in a first subset of the layers; and meander lines, to provide a phase shift and match, disposed in a second subset of the layers, wherein the substrate includes a low-cost material and the metal layers include a feature trace and gap widths of about 10 mils or greater.

In some aspects, the techniques described herein relate to a HOFS integrated meander line polarizer and radome, wherein the low-cost material includes a polycarbonate.

In some aspects, the techniques described herein relate to a HOFS integrated meander line polarizer and radome, wherein the low-cost material includes a polyester.

In some aspects, the techniques described herein relate to a HOFS integrated meander line polarizer and radome, wherein each of the meander lines is shaped as a rectangular wave and the meander lines are stacked above each other.

In some aspects, the techniques described herein relate to a HOFS integrated meander line polarizer and radome, wherein the substrate has a cross-section depth between 150 and 450 mils.

In some aspects, the techniques described herein relate to a HOFS integrated meander line polarizer and radome, wherein the HOFS integrated meander line polarizer and radome is configured to operate in a frequency range including 10.7 to 14.5 GHz.

In some aspects, the techniques described herein relate to a HOFS integrated meander line polarizer and radome, wherein the integrated HOFS meander line polarizer radome is configured to operate with a scan angle θ from 0° to 50° and a φ scan angle from 0° and 360°.

In some aspects, the techniques described herein relate to a HOFS integrated meander line polarizer and radome, further including a radome including polycarbonate.

In some aspects, the techniques described herein relate to a HOFS integrated meander line polarizer and radome, wherein the radome includes polycarbonate having a thickness of at least 30 mils.

In some aspects, the techniques described herein relate to a HOFS integrated meander line polarizer and radome, wherein the radome has a cross-section depth less than 120 mils.

In some aspects, the techniques described herein relate to a HOFS integrated meander line polarizer and radome, wherein the radome has a cross-section depth between 20 and 60 mils.

In some aspects, the techniques described herein relate to an integrated HOFS meander line polarizer radome, wherein the dielectric constant of the radome is between 2.0 and 5.0.

In some aspects, the techniques described herein relate to a HOFS integrated meander line polarizer and radome, wherein the substrate has a cross-section depth between 150 and 450 mils.

One general aspect includes a polarizer radome including:

Additional features will be set forth in the description that follows, and in part will be apparent from the description, or may be learned by practice of what is described.

DRAWINGS

The patent or application file contains at least one drawing executed in color. Copies of this patent or patent application publication with color drawings will be provided by the Office upon request and payment of the necessary fee.

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
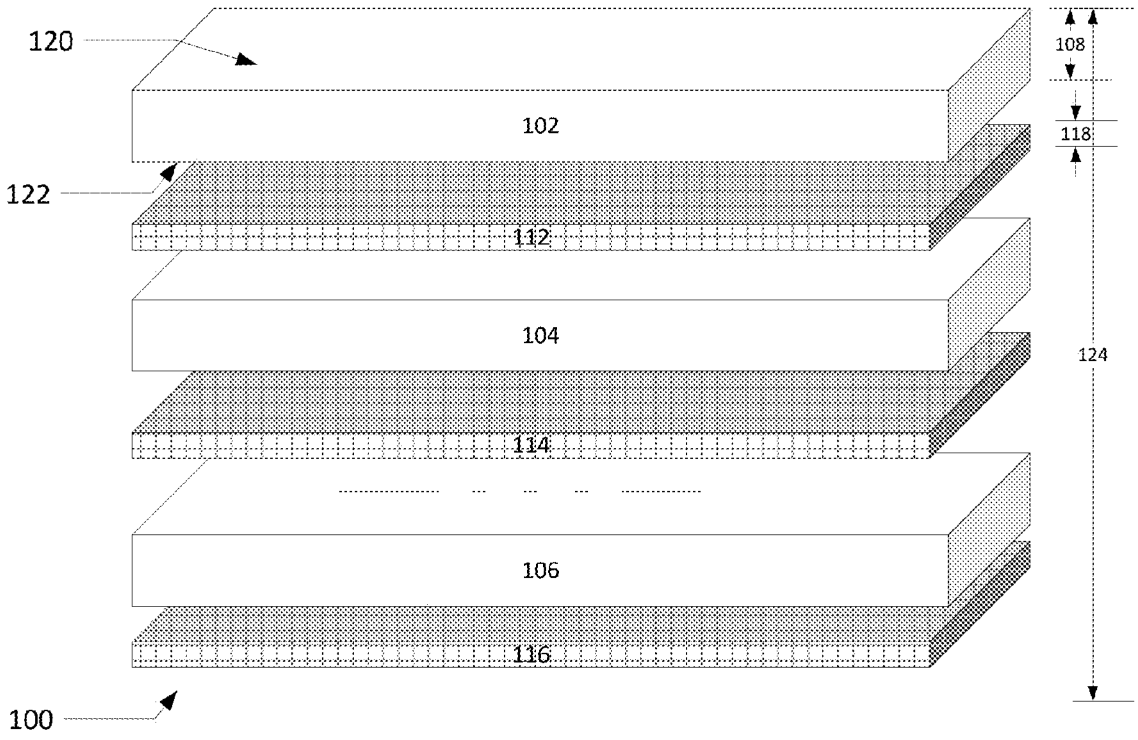
FIG. 1 is a cross-sectional view of a HOFS integrated meander line polarizer and radome according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings are directed to an integrated higher order Floquet mode meander line polarizer radome to provide improved bandwidth, insertion loss, axial ratio, and scan volume. In some embodiments, the apparatus operates across a frequency range 10.7 GHz-14.5 GHz. In some embodiments, the apparatus operates across a wide half conical scan angle spanning 0-50 degrees. In some embodiments, the apparatus operates with an Axial Ratio<2.0 dB. In some embodiments, an Insertion Loss<−0.8 dB to 50 degrees. In other embodiments, the apparatus includes an integrated Radome, for example, a 30-mil polycarbonate radome integrated with the meander line polarizer. The meander line polarizer may be disposed in a polycarbonate or a polyester. In some embodiments, the apparatus may have a Total stack height, including radome, of about 290 mils.

A low-profile antenna system that includes an HOFS integrated meander line polarizer and radome is desirable in many applications including aero and ground applications. An HOFS integrated meander line polarizer and radome permits a low-cost low-profile deployment and reduces air drag induced by the airborne antenna. Moreover, low profile antennas systems are important for packaging and other deployments. The HOFS integrated meander line polarizer and radome may be used in antenna systems that operate in a wide frequency range with large scan volume requirements such as satellite systems like the Low-Earth Orbit or Mid-Earth Orbit satellite systems. The HOFS integrated meander line polarizer and radome may be used for vehicular and aeronautical applications in Low-Earth Orbit, Mid-Earth Orbit, Geosynchronous Earth Orbit, High Altitude Platform satellite systems.

A HOFS integrated meander line polarizer and radome being used for a frequency range that spans 10.7 to 14.5 GHz and a scan volume spanning 0-50 degrees, the insertion loss for a separate radome severely affects antenna system performance. An insertion loss requirement of −0.25 dB reflects the problem that insertion loss must be allocated between the meander line polarizer and the separate radome. Generally, a −0.3 dB of insertion loss is allocated to the separate meander line polarizer. In the present teachings, the entire −0.55 dB of insertion loss is allocated to the HOFS integrated meander line polarizer and radome. The reflection from the HOFS integrated meander line may be used to match the reflection from the radome.

Similarly, for a frequency range that spans 10.7 to 14.5 GHz and a scan volume spanning 0-50 degrees, a meander line polarizer insertion loss value for a separate meander line polarizer is too high. As the separate meander line polarizer is a space fed radiating element scanning to 50 degrees over a 10.7-14.5 frequency band, a separate meander line polarizer has greater than −11.75 dB return loss.

FIG. 1 is a partial expanded view of a HOFS integrated meander line polarizer and radome according to various embodiments.

A HOFS integrated meander line polarizer and radome 100 may include substrates 102, 104, 106. Each of the substrates 102, 104, 106 may be a dielectric formed, for example, from a polycarbonate, from a polyester. Each of the substrates 102, 104, 106 may include a top surface 120 and a bottom surface 122. A count of the substrates 102, 104, 106 may vary, for example, greater than or equal to 4, greater than or equal to 5, greater than or equal to 6, or the like. A thickness 108 of each the substrates 102, 104, 106 may vary, for example, greater than or equal to 20 mils, greater than or equal to 40 mils, greater than or equal to 10 mils, or the like. Either the top surface 120 or the bottom surface 122 of each of the substrates 102, 104, 106 may include a coating to address environmental concerns, for example, substrate 102 that may form a radome.

The HOFS integrated meander line polarizer and radome 100 may include metal layers 112, 114, 116 interspersed within the substrates 102, 104, 106. The metal layers 112, 114, 116 may be printed on either the top surface 120 or the bottom surface 122 of each of the substrates 102, 104, 106. One or more of the substrates 102, 104, 106 may be printed with metal layers 112, 114, 116 on both the top surface 120 and the bottom surface 122. One or more of the substrates 102, 104, 106 may be without a metal layer disposed on either the top surface 120 or the bottom surface 122. Patterns formed by the metal layers 112, 114, 116 may be different. Metal layers 112, 114, 116 may use a feature trace and gap widths of about 10 mils or greater. Metal layers 112, 114, 116 may use line widths of 10 mils or greater. Metal layers 112, 114, 116 may use gaps between metal lines having a width of 10 mils or greater. The printing of the metal layers may be done by a variety of metal printing techniques known in the art. Metal layers 112, 114, 116 may be formed of a material composition of high conductivity, such as copper, conductive ink, or the like. A thickness 118 of each of the metal layers 112, 114, 116 may be effectively zero mils.

A thickness 124 of the HOFS integrated meander line polarizer and radome 100 may be about 200 mils or greater, about 250 mils or greater or about 300 mils or greater, or the like. The HOFS integrated meander line polarizer and radome 100 may include additional substrates and metal layers. An adhesive (not shown) may be disposed between the top and bottom surfaces of the substrates 102, 104, 106 to form the HOFS integrated meander line polarizer and radome 100.

Figure 2A:
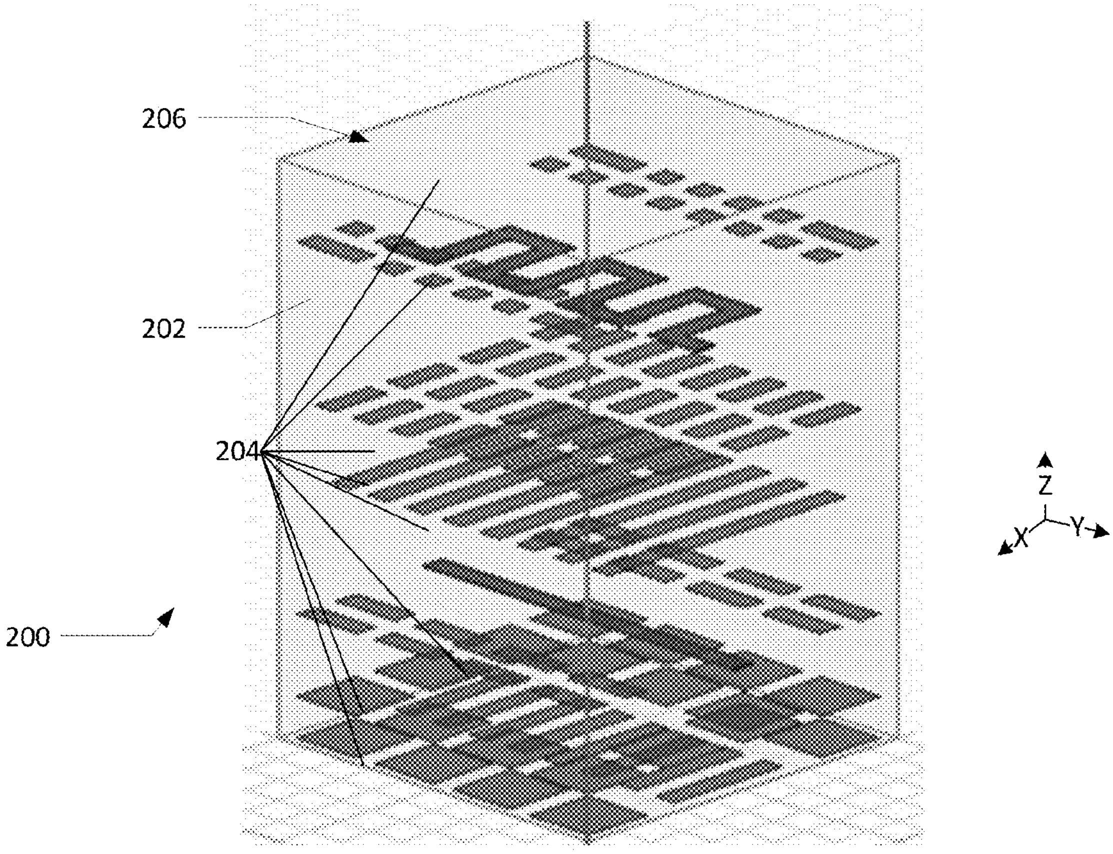
FIG. 2A is a perspective view of a HOFS integrated meander line polarizer and radome as a unit cell according to various embodiments.

FIG. 2A is a perspective view of a HOFS integrated meander line polarizer and radome as a unit cell according to various embodiments.

Figure 2B:
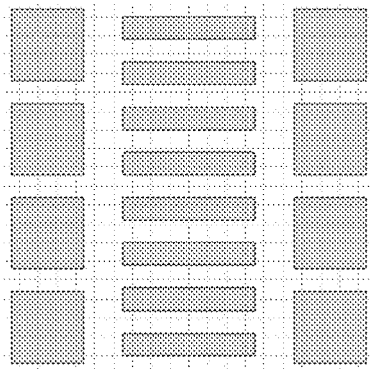
FIG. 2B is a cross-sectional view of a metal layer of a HOFS integrated meander line polarizer and radome of FIG. 2A.

FIG. 2B is a cross-sectional view of a metal layer of a HOFS integrated meander line polarizer and radome of FIG. 2A.

Figure 2C:
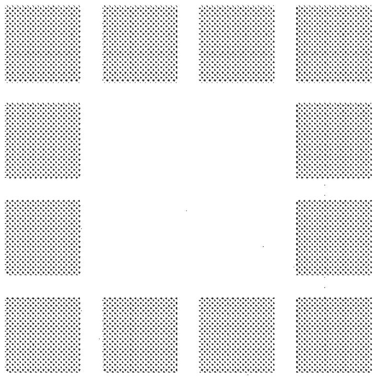
FIG. 2C is a cross-sectional view of a metal layer of a HOFS integrated meander line polarizer and radome of FIG. 2A.

FIG. 2C is a cross-sectional view of a metal layer of a HOFS integrated meander line polarizer and radome of FIG. 2A.

Figure 2D:
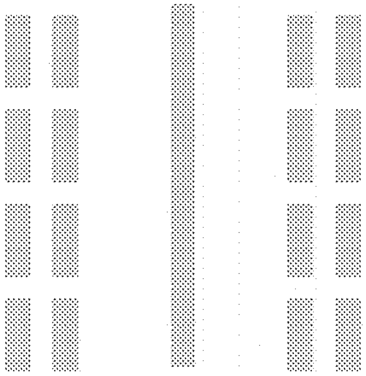
FIG. 2D is a cross-sectional view of a metal layer of a HOFS integrated meander line polarizer and radome of FIG. 2A.

FIG. 2D is a cross-sectional view of a metal layer of a HOFS integrated meander line polarizer and radome of FIG. 2A.

Figure 2E:
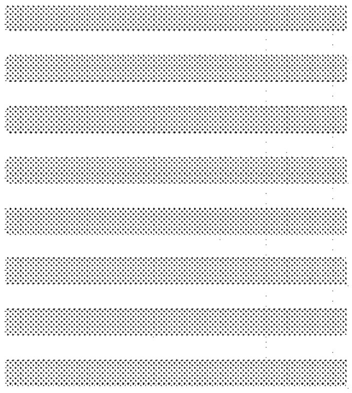
FIG. 2E is a cross-sectional view of a metal layer of a HOFS integrated meander line polarizer and radome of FIG. 2A.

FIG. 2E is a cross-sectional view of a metal layer of a HOFS integrated meander line polarizer and radome of FIG. 2A.

Figure 2F:
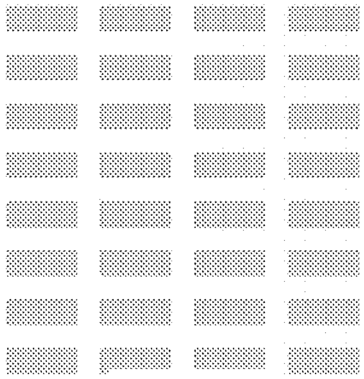
FIG. 2F is a cross-sectional view of a metal layer of a HOFS integrated meander line polarizer and radome of FIG. 2A.

FIG. 2F is a cross-sectional view of a metal layer of a HOFS integrated meander line polarizer and radome of FIG. 2A.

Figure 2G:
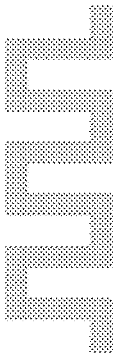
FIG. 2G is a cross-sectional view of a metal layer of a HOFS integrated meander line polarizer and radome of FIG. 2A.

FIG. 2G is a cross-sectional view of a metal layer of a HOFS integrated meander line polarizer and radome of FIG. 2A.

Figure 2H:
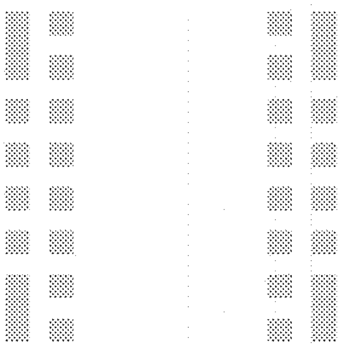
FIG. 2H is a cross-sectional view of a metal layer of a HOFS integrated meander line polarizer and radome of FIG. 2A.

FIG. 2H is a cross-sectional view of a metal layer of a HOFS integrated meander line polarizer and radome of FIG. 2A.

An HOFS integrated meander line polarizer and radome 200 may include substrates 202 with metal layers 204 with an outer radome surface 206. Demarcations between substrates 202 are not shown to ease understanding. Each of the substrates 202 may have a top surface and a bottom surface (see FIG. 1). The metal layers 204 may be disposed on no (zero) surfaces of one or more of the substrates 202. The metal layers 204 may be disposed on the top or bottom surfaces of one or more of the substrates 202. The radome 206 may be an integrated radome. The radome 206 may include an environmentally robust material, for example, a polycarbonate, a polyester. The radome 206 may have a dielectric constant of about 2.9. The radome may have a loss tan of 0.02 or the like. The radome 206 may be affixed to the substrate 202 using an adhesive (not shown). The radome 206 may be treated as a layer of the HOFS integrated meander line polarizer and radome 200. The radome 206 may have a depth, illustrated as the Z direction, in FIG. 2. The depth of the radome 206 may be at least 30 mil. A mil is a thousandth of an inch; one mil equals 0.0254 millimeters. The HOFS integrated meander line polarizer and radome 200 may have a depth of about 280 mils.

The metal layers 204 may include lines having a width of 10 mils or greater. The substrate 202 may include a material having a dielectric constant greater than 2, for example, between 2.0 and 5.0, about 2.9; though a person of ordinary skill in the art having the benefit of the disclosure may appreciate that other dielectric constants are envisioned. The substrate 202 may include a polycarbonate or polyester material. The substrate may have a depth (Z-axis) between 150 and 450 mils, for example, 260 mils. The substrate may be implemented in a printed circuit board (PCB) technology. In some embodiments, the radome and the substrate may be integrated as a PCB.

A HOFS integrated meander line polarizer and radome including the radome and the substrate may have a depth of about 280 mil or greater. The substrate (PCB stack) may be integrated with the first substrate (radome) such that they are formed and cured concurrently without any airgap between them. In some embodiments, the PCB stack and the radome are in direct contact. In some embodiments, an HOFS integrated meander line polarizer and radome may be disposed in a grid array, for example, a triangular grid array, an equilateral triangle grid array, a rectangular grid array. The array of HOFS integrated meander line polarizer and radomes may be implemented as a polycarbonate stack. The substrate may include a number of printed circuit board layers; all printed circuit board layers may include a high dielectric constant material. The printed circuit board maybe balanced to reduce warping.

The patterns of the metallic layers 204 may be periodic/repetitive, for example, repeating every 200 mil. in x- and y-dimensions for the exemplary embodiment of FIG. 2A through FIG. 2H. Using sufficient number of unit cells, one can generate a HOFS integrated meander line polarizer and radomes of desired size. In some embodiments, the radome 206 may have no metallic layers formed thereupon. In some embodiments, the radome 206 may be treated with appropriate coatings to meet the necessary environmental requirements.

Figure 3A:
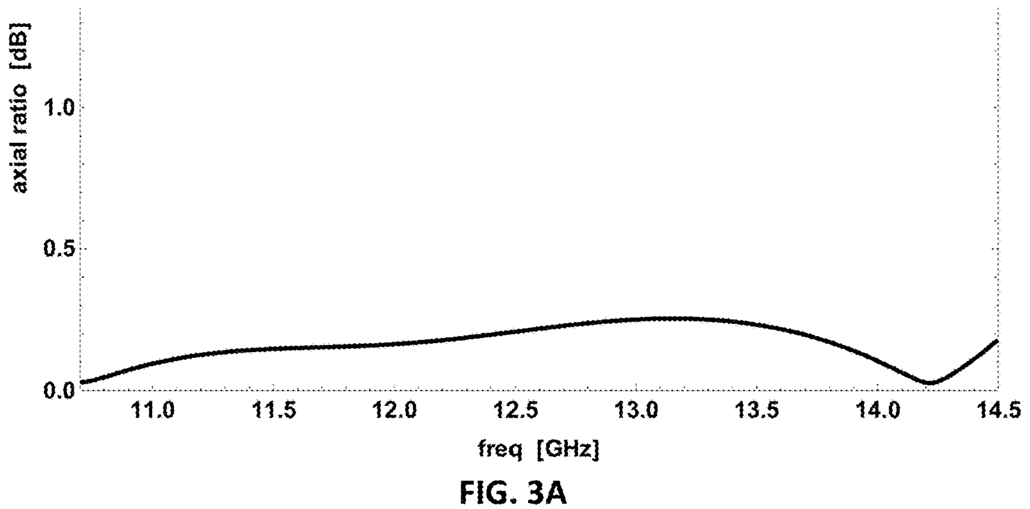
FIG. 3A-3C show graphical representations of the performance of an HOFS integrated meander line polarizer and radome according to various embodiments.
Figure 3B:
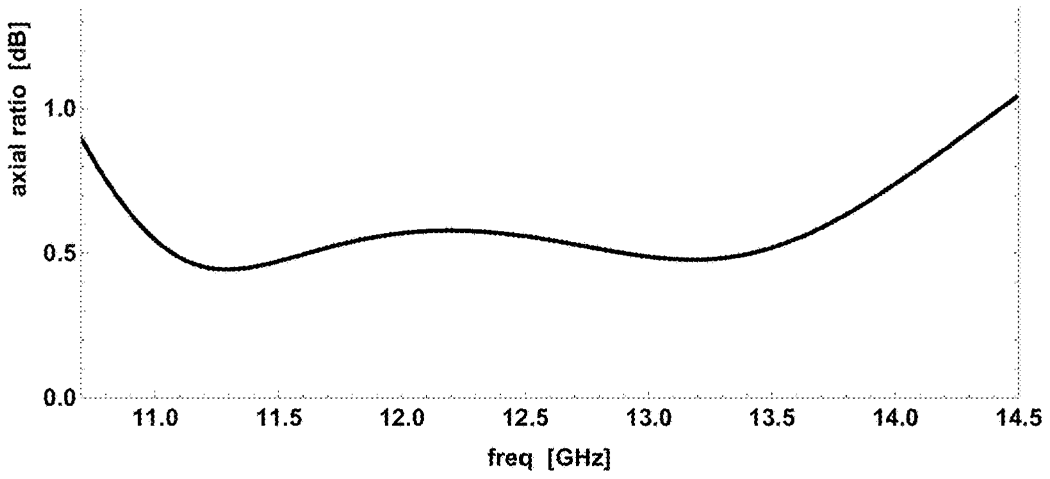
Figure 3C:
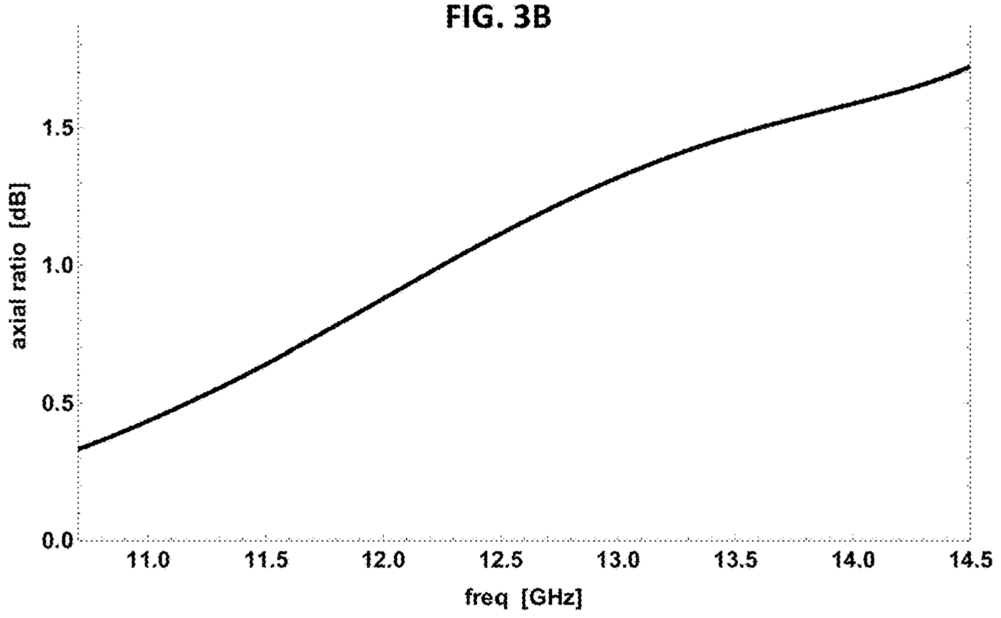

FIG. 3A illustrates a rectangular plot of the axial ratio of an integrated higher order Floquet mode meander line polarizer radome of the present teachings at theta=0, phi=0 scan. FIG. 3B illustrates a rectangular plot of the axial ratio of an integrated higher order Floquet mode meander line polarizer radome of the present teachings at theta=50, phi=0 scan. FIG. 3C illustrates a rectangular plot of the axial ratio of an integrated higher order Floquet mode meander line polarizer radome of the present teachings at theta=50, phi=90 scan. The axial ratio meets the 2 dB axial ratio requirement with significant margin over the entire frequency band. The impact of the radome is included in the results and will not degrade system performance. In FIG. 3A, FIG. 3B, FIG. 3C the calculated axial ratio meets the 2 dB axial ratio requirement with significant margin over a 10.7 to 14.5 GHz frequency band. The illustrated plots include an impact of the radome on the integrated higher order Floquet mode meander line polarizer radome.

Figure 4A:
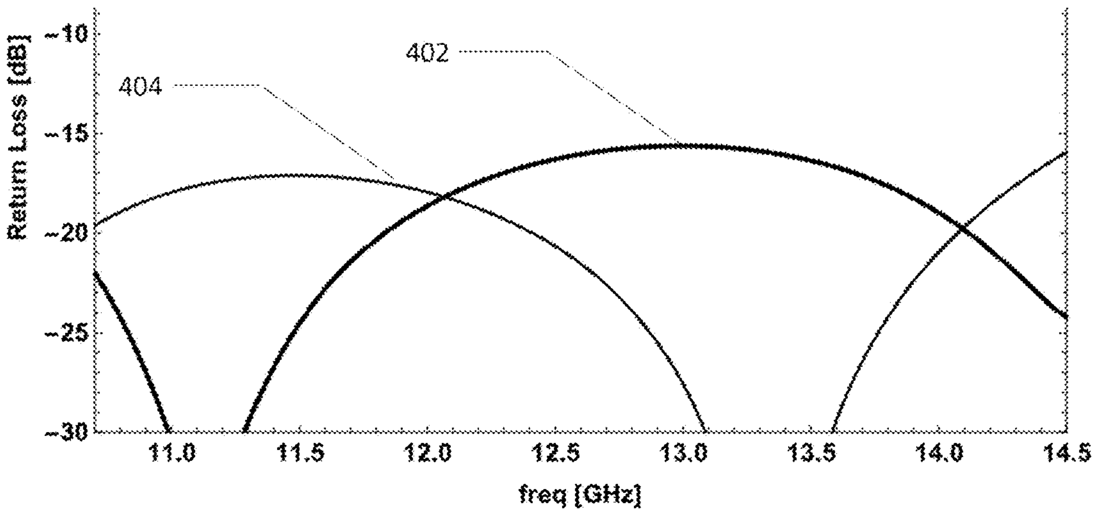
FIG. 4A-4C show graphical representations of the performance of an HOFS integrated meander line polarizer and radome according to various embodiments.
Figure 4B:
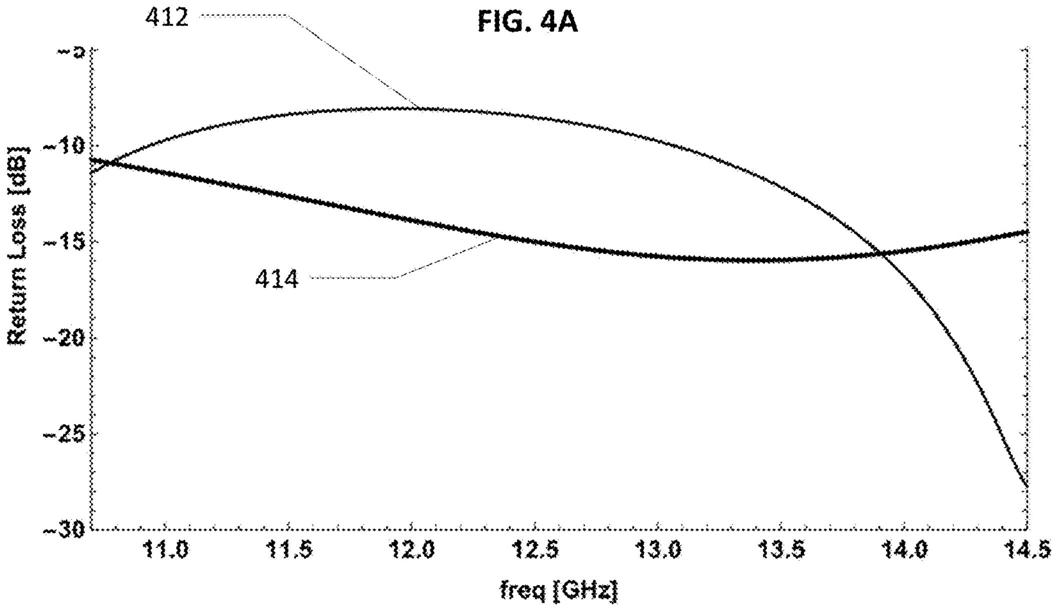
Figure 4C:
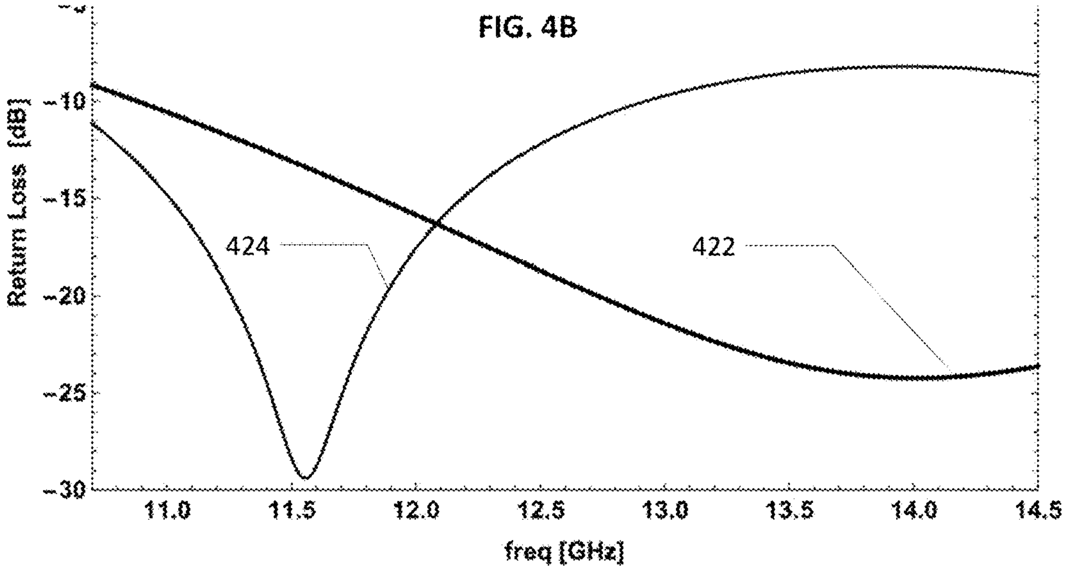

FIG. 4A illustrates a rectangular plot of the return loss of an integrated HOFS meander line polarizer radome of the present teachings at theta=0, phi=0 scan showing return loss for a horizontal polarization 402 and a vertical polarization 404. FIG. 4B illustrates a rectangular plot of the return loss of an integrated HOFS meander line polarizer radome of the present teachings at theta=50, phi=0 scan showing return loss for a horizontal polarization 412 and a vertical polarization 414. FIG. 4C illustrates a rectangular plot of the return loss of an integrated HOFS meander line polarizer radome of the present teachings at theta=50, phi=90 scan showing return loss for a horizontal polarization 422 and a vertical polarization 424. In FIG. 4A, FIG. 4B, and FIG. 4C the calculated return loss meets a return loss requirement with significant margin over a 10.7 to 14.5 GHz frequency band. The illustrated plots include an impact of the radome on the integrated HOFS meander line polarizer radome.

Figure 5A:
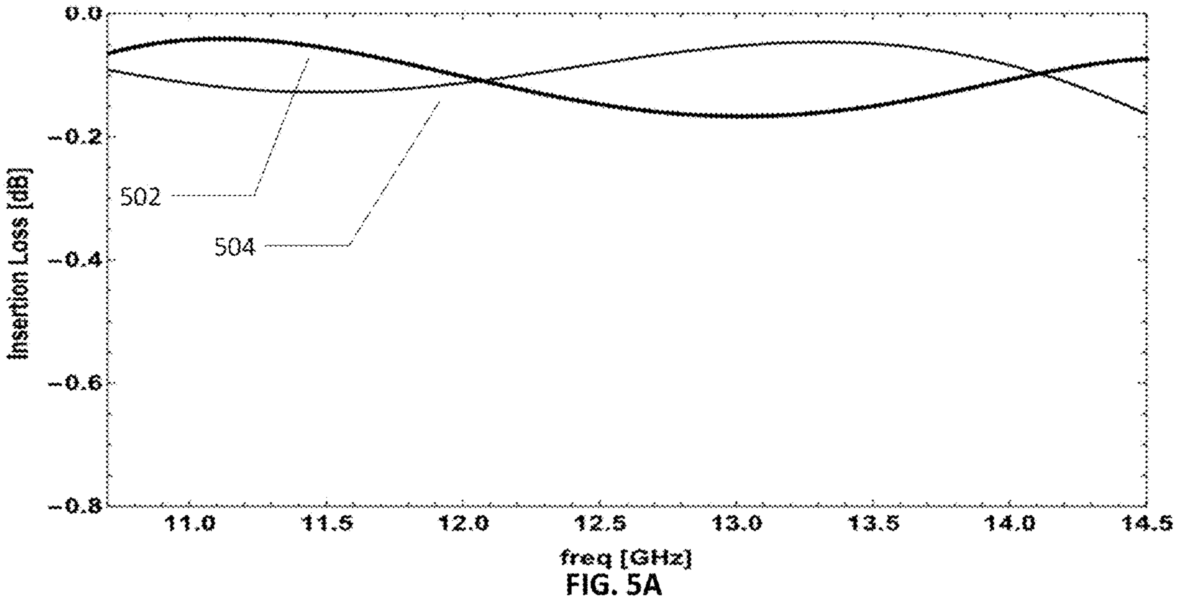
FIG. 5A-5C show graphical representations of the performance of an HOFS integrated meander line polarizer and radome according to various embodiments.
Figure 5B:
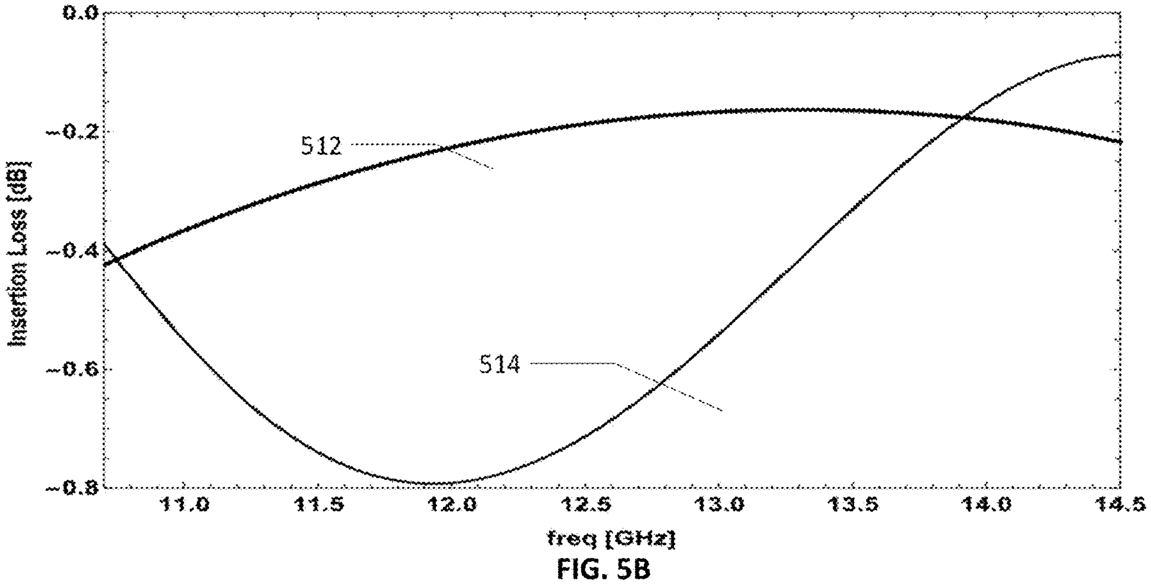
Figure 5C:
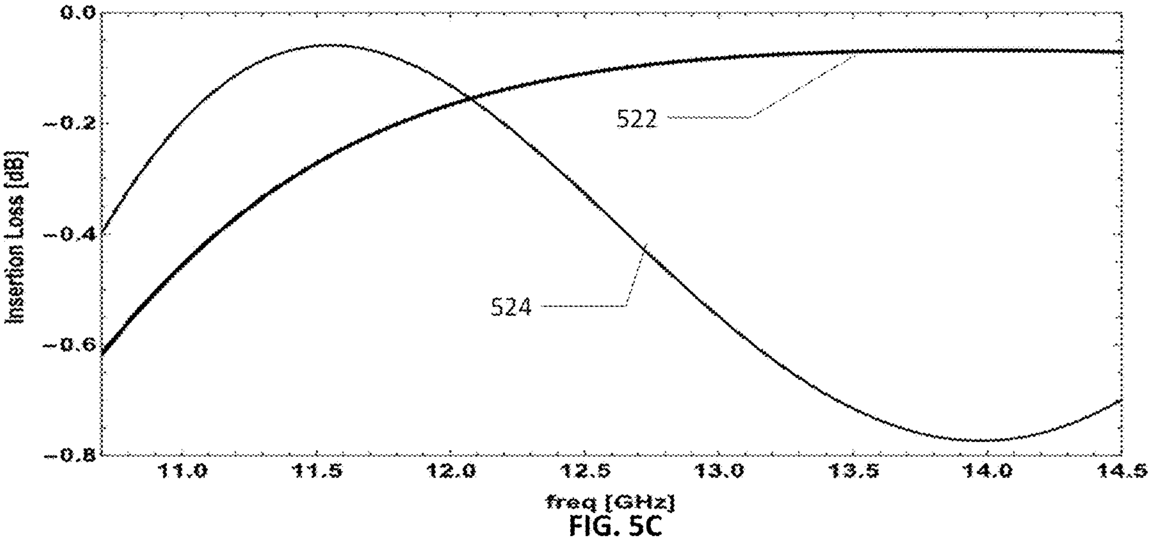

FIG. 5A illustrates a rectangular plot of the insertion loss of an integrated HOFS meander line polarizer radome of the present teachings at theta=0, phi=0 scan showing insertion loss for a horizontal polarization 502 and a vertical polarization 504. FIG. 5B illustrates a rectangular plot of the insertion loss of an integrated HOFS meander line polarizer radome of the present teachings at theta=50, phi=0 scan showing insertion loss for a horizontal polarization 512 and a vertical polarization 514. FIG. 5C illustrates a rectangular plot of the insertion loss of an integrated HOFS meander line polarizer radome of the present teachings at theta=50, phi=90 scan showing insertion loss for a horizontal polarization 522 and a vertical polarization 524. In FIG. 5A, FIG. 5B and FIG. 5C the calculated insertion loss meets the insertion loss requirement with significant margin over a 10.7 to 14.5 GHz frequency band. The illustrated plots include an impact of the radome on the integrated higher order Floquet mode meander line polarizer radome.

Figure 6:
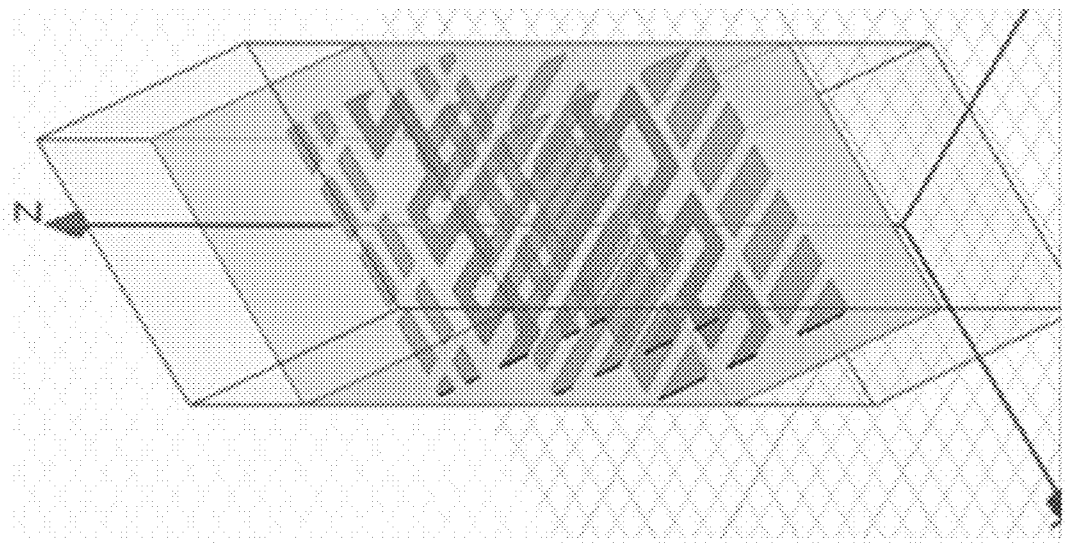
FIG. 6 is a perspective view of a HOFS integrated meander line polarizer and radome according to various embodiments.

FIG. 6 is a perspective view of a HOFS integrated meander line polarizer and radome according to various embodiments which may be disposed in a skewed lattice, for example, a triangular lattice of FIG. 6.

Figure 7:
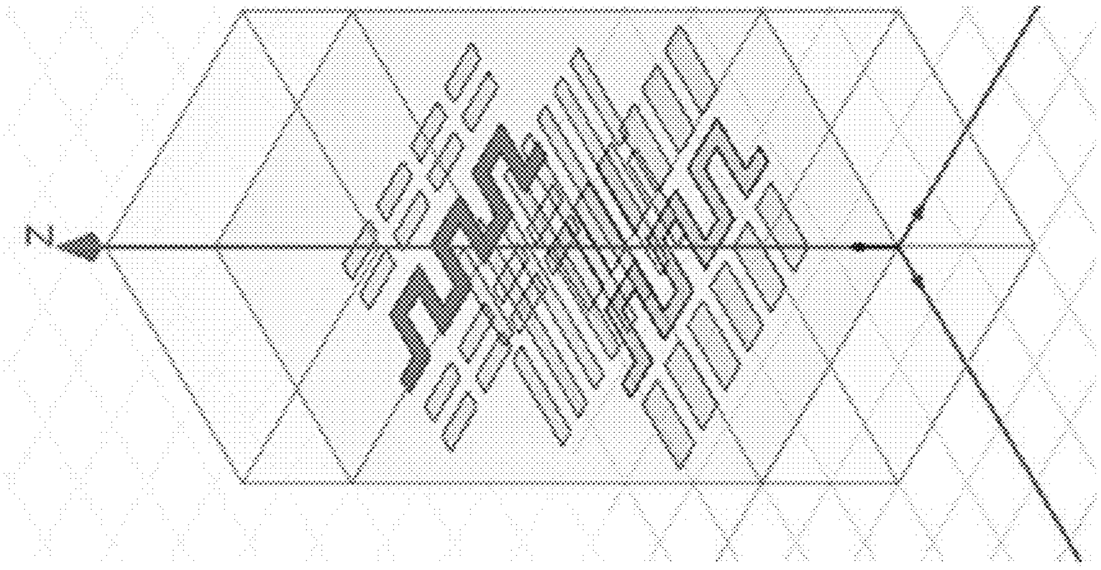
FIG. 7 is a perspective view of a HOFS integrated meander line polarizer and radome according to various embodiments.

FIG. 7 is a perspective view of a HOFS integrated meander line polarizer and radome according to various embodiments which may be disposed in a square or rectangular lattice.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A higher order Floquet-mode structure (HOFS) integrated meander line polarizer and radome comprising:

a substrate comprising layers having a dielectric constant (dk) of 2.9;

a HOFS comprising metal layers disposed in a first subset of the layers;

meander lines, to provide a phase shift and match, disposed in a second subset of the layers; and a radome comprising polycarbonate, wherein the substrate comprises a low-cost material and the metal layers comprise a feature trace and gap widths of about 10 mils or greater.

2. The HOFS integrated meander line polarizer and radome of claim 1, wherein the low-cost material comprises a polycarbonate.

3. The HOFS integrated meander line polarizer and radome of claim 1, wherein the low-cost material comprises a polyester.

4. The HOFS integrated meander line polarizer and radome of claim 1, wherein each of the meander lines is shaped as a rectangular wave and the meander lines are stacked above each other.

5. The HOFS integrated meander line polarizer and radome of claim 1, wherein the substrate has a cross-section depth between 150 and 450 mils.

6. The HOFS integrated meander line polarizer and radome of claim 1, wherein the HOFS integrated meander line polarizer and radome is configured to operate in a frequency range comprising 10.7 to 14.5 GHz.

7. The HOFS integrated meander line polarizer and radome of claim 1, wherein the integrated HOFS meander line polarizer radome is configured to operate with a scan angle θ from 0° to 50° and a φ scan angle from 0° and 360°.

8. The HOFS integrated meander line polarizer and radome of claim 1, wherein the radome comprises polycarbonate having a thickness of at least 30 mils.

9. The HOFS integrated meander line polarizer and radome of claim 1, wherein the radome has a cross-section depth less than 120 mils.

10. The HOFS integrated meander line polarizer and radome of claim 1, wherein the radome has a cross-section depth between 20 and 60 mils.

11. The HOFS integrated meander line polarizer and radome of claim 1, wherein the dielectric constant of the radome is between 2.0 and 5.0.

12. The HOFS integrated meander line polarizer and radome of claim 1, wherein the substrate has a cross-section depth between 150 and 450 mils.

13. A higher order Floquet-mode structure (HOFS) integrated meander line polarizer and radome comprising:

a substrate comprising layers;

a HOFS comprising metal layers disposed in a first subset of the layers; and meander lines, to provide a phase shift and match, disposed in a second subset of the layers, wherein the substrate comprises a low-cost material and the metal layers comprise a feature trace and gap widths of about 10 mils or greater, the low-cost material comprises a polycarbonate and the substrate has a cross-section depth between 150 and 450 mils.

14. The HOFS integrated meander line polarizer and radome of claim 13, wherein the HOFS integrated meander line polarizer and radome is configured to operate in a frequency range comprising 10.7 to 14.5 GHz.

15. The HOFS integrated meander line polarizer and radome of claim 13, wherein the integrated HOFS meander line polarizer radome is configured to operate with a scan angle θ from 0° to 50° and a φ scan angle from 0° and 360°.

16. The HOFS integrated meander line polarizer and radome of claim 13, further comprising a radome comprising polycarbonate having a cross-section depth less than 120 mils.

17. A higher order Floquet-mode structure (HOFS) integrated meander line polarizer and radome comprising:

a substrate comprising layers;

a HOFS comprising metal layers disposed in a first subset of the layers; and meander lines, to provide a phase shift and match, disposed in a second subset of the layers; and a radome comprising polycarbonate having a cross-section depth of less than 120 mils, wherein the substrate comprises a low-cost material and the metal layers comprise a feature trace and gap widths of about 10 mils or greater, and the low-cost material comprises a polycarbonate.

* * * * *